(12) United States Patent
Moshfeghi et al.

(10) Patent No.: US 6,779,119 B1
(45) Date of Patent: Aug. 17, 2004

(54) ACTUAL AND PERCEIVED RESPONSE TIME, USER INTERFACE, AND SECURITY VIA USAGE PATTERNS

(75) Inventors: Mehran Moshfeghi, Sunnyvale, CA (US); Bart De Greef, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,610

(22) Filed: Jun. 30, 1999

(51) Int. Cl.[7] .................... G06F 15/16; G06F 15/173; G06F 17/30; G06F 7/00
(52) U.S. Cl. .................. 713/201; 703/201; 709/203; 709/219; 709/223; 707/2; 707/6
(58) Field of Search .................... 713/201; 709/223, 709/203, 219; 707/2, 6

(56) References Cited

U.S. PATENT DOCUMENTS

| | | | |
|---|---|---|---|
| 5,713,008 A | 1/1998 | Falkner ...................... | 711/118 |
| 5,737,619 A | 4/1998 | Judson ....................... | 715/500 |
| 5,754,938 A | 5/1998 | Herz et al. .................. | 725/116 |
| 5,819,033 A | 10/1998 | Caccavale ................... | 709/224 |
| 5,848,396 A | 12/1998 | Gerace ....................... | 705/10 |
| 6,085,193 A * | 7/2000 | Malkin et al. ................ | 707/10 |
| 6,182,133 B1 * | 1/2001 | Horvitz ....................... | 709/223 |
| 6,195,622 B1 * | 2/2001 | Altschuler et al. ............. | 703/2 |
| 6,507,867 B1 * | 1/2003 | Holland et al. ............... | 709/219 |
| 6,587,877 B1 * | 7/2003 | Douglis et al. ............... | 709/224 |

OTHER PUBLICATIONS

"Prefetching in World Wide Web" by Zheng Wang and Jon Crowcroft in IEEE, Nov. 18, 1996, pp. 28–32.
A Top–10 Approach to Prefetching on the Web, by Evangelos P. Markatos and Catherine E. Chronaki, in Technical Report Forth, Aug. 1996, pp. 1–15.
"Automatic Prefetching in a WAN" by James Griffoen and Randy Appleton, in Proceedings of the IEEE Workshop on Advances in Parallel and Distributed Systems, Princeton, NJ, USA Oct. 6, 1993, pp. 8–12.
"Using Predictive Prefetching to Improve World Wide Web Latency" by Venkata N. Padmanabhan and Jeffrey C. Mogul, in Computer Communications Review, US Association for Computing Machinery, NY, vol. 26, No. 3, Jul. 1, 1996, pp. 22–36.
"Survey of IDS" by C.Chung, Homepage of Christina Chung 'Online! Jun. 1998 retrieved from the Internet: URL:http://seclab.cs.ucdavis.edu/{chungy/doc/IDSsurvey.htm. retrieved on Feb. 26, 2001.
"Application Selectable Caching Design & Implementations" by Olivier Fambon & and Daniel Hagimont in Esprit Research Program—Perdis Project, Online ! Dec. 9, 1998, pp. 1–10, retrieved from the Internet: URL:http://www.perdis.espirit.ec.org/deliverables/docs/wpC/.tc22a/. retrieved on Feb. 26, 2001.

(List continued on next page.)

*Primary Examiner*—Justin T. Darrow
*Assistant Examiner*—Abdulhakim Nobahar
(74) *Attorney, Agent, or Firm*—John F. Vodopia (57) ABSTRACT

A variety of performance optimization techniques are provided that are based upon a history of a user's usage patterns. To reduce actual response time, the system prefetches information in anticipation of the user's request. To reduce perceived response time, if a response to the user's request is likely to be delayed, the system initiates other anticipated fast-response processes for the user. To ease the user's interaction with the system, the user's interface is dynamically modified to facilitate the entry of anticipated requests. To improve security, increased security measures are invoked when the user's request pattern is inconsistent with prior request patterns. At a system level, performance assessments and optimizations, including dynamic load balancing, are based on the prior usage patterns of mulitple users.

16 Claims, 3 Drawing Sheets

OTHER PUBLICATIONS

E. Rahm, "Evaluation of Closely Coupled Systems for High Performance Databaseprocessing", Proceedings of the International Conference on DIstributed Computing Systems, US, Los Alamitos, IEEE Comp. Soc. Press, vol. Conf. 13, May 25, 1993, pp. 301–310, XP000399400.

M. Kasbekar et al, "PSNOW: A Tool To Evaluate Architectural Issues for Now Encironments", vienna, Jul. 7–11, 1997, New York, ACM, US, vol. Conf. 11, Jul. 7, 1997, pp. 100–107, XP000755246.

"Remotely familiar: using computerized monitoring to study remote use" by T.A. Peters, in Library Trends, vol. 47, No. 1, pp. 7–20, Summer 1998.

"Evaluating server–assisted cache replacement in the Web" by E. Cohen, B. Krishnamurthy J. Rexford. In Algorithms— ESA '98, $6^{th}$ Annual European Symposium. Proceedings, pp. 307–319, Published: Berlin, Germany, 1998, xii+513 pp.

"Discovering Web access patterns and trends by applying OLAP and data mining technology on Web Logs" by OR Zaine, Xih Man, Han Jiawei, in Proceedings—ADL '98 (Cat. No. 98TB100235), pp. 19–29, Published: Los Alamitos, CA, USA 1998, X+328 pp.

"SpeedTracer: a Web usage mining and analysis tool", by KL Wu, PS Yu, A. Ballman, IBM Systems Journal, vol. 37, No. 1, pp. 89–105, 1998.

* cited by examiner

ACTUAL AND PERCEIVED RESPONSE TIME, USER INTERFACE, AND SECURITY VIA USAGE PATTERNS

BACKGROUND OF THE INVENTION

1. Field of the Invention

This invention relates to the field of computer systems, and in particular to systems with data access latency.

2. Description of Related Art

With increasing information availability, increasing use of computer systems and networks, and an increasingly diverse population of computer users, conventional processing and networking techniques are becoming increasingly unsatisfactory. One example of the problem can be found in the "computer-ization" of the medical profession. In the past, patient files, test results, x-rays, and the like were communicated via physical media, such as paper notes, photographs, and computer printouts. Today, medical professional expect to have all of this information, and more, available on demand at the nearest computer display device. Characteristically, the items that are on demand often are those that are information-laden, such as x-ray and cat-scan images. An explanation of bandwidth limitations, information transfer, system loading, and the like has little effect on assuaging the discontent of such professionals when they are forced to wait for items that had heretofore been available "at their fingertips" from the files of physical media.

Techniques have been developed to alleviate some of the frustrations caused by the delays that are inherent to electronic information transfer. Data compression techniques, for example, aid in reducing the amount of data that needs to be transferred to convey the information. Hierarchical data transfer is commonly employed to provide a "higher-level" view of the information before all the lower level details are communicated, allowing for a termination of the transfer as soon as it discovered that further details are not required. Multi-path communication networks and packet transmission techniques allow for messages to arrive via alternative paths, depending upon the current congestion of each path. In like manner, multi-tiered networks allow for a hierarchy of network clusters, wherein "local" traffic is contained within each cluster, and the communications paths between clusters are reserved for inter-network traffic.

Despite these advances in, communications and network technologies, it is often the case that a user enters a command on a client processor and is forced to wait while the information is being communicated from a remote processor, or while the process corresponding to the command is being loaded for execution by the client processor from a local or remote storage device. In a number of situations, particularly when the user is anxious to receive the information, the perceived delay often exceeds the actual response time. This differential between perceived response time and actual response time often increases the frustration level, and in some situations, compounds the problem when the user resubmits the same request.

BRIEF SUMMARY OF THE INVENTION

It is an object of this invention to provide a system having an improved actual response time to user requests. It is a further object of this invention to provide a system having an improved perceived response time to user requests. It is a further object of this invention to provide an improved user interface for communicating user requests. It is a further object of this invention to provide improved system security while processing user requests.

These objects and others are achieved by employing a variety of performance optimization techniques based upon a history of a user's usage of the system. A number of techniques are employed to enhance the system performance from an individual user's perspective, as follows. Based on the user's prior usage patterns, the system prefetches information in anticipation of the user's request. Based on the user's prior usage patterns, if a response to the user's request is likely to be delayed, the system initiates other anticipated fast-response processes for the user, to reduce the perceived delay. Based on the user's prior usage patterns, the user's interface is modified to facilitate the entry of anticipated requests. Based on the user's prior usage patterns, increased security measures are invoked when the user's request pattern is inconsistent with prior request patterns. At a system level, performance assessments and optimizations, including dynamic load balancing, are based on the prior usage patterns of multiple users.

BRIEF DESCRIPTION OF THE DRAWINGS.

The invention is explained in further detail, and by way of example, with reference to the accompanying drawings wherein.

DETAILED DESCRIPTION OF THE INVENTION

Figure 1:
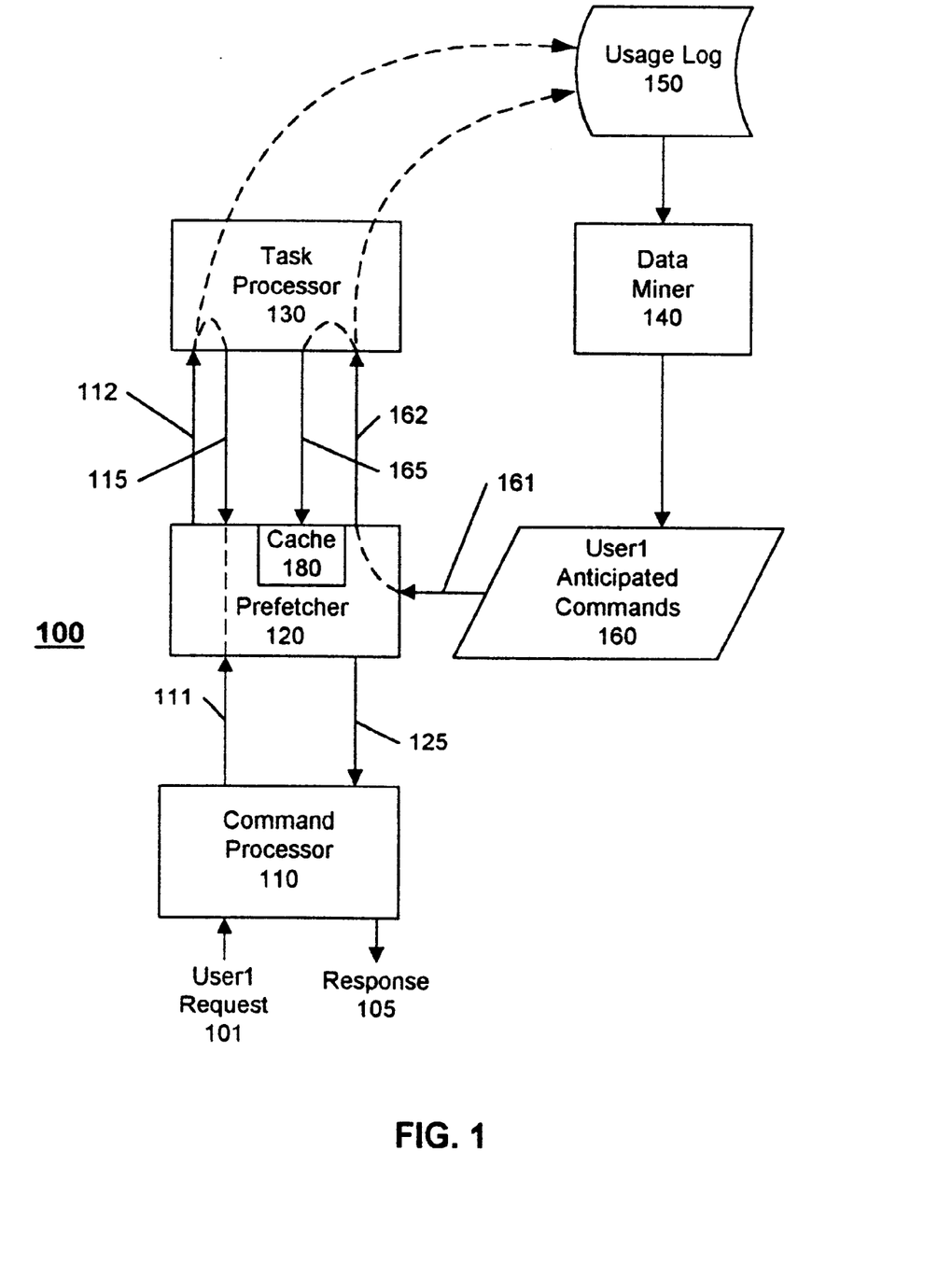
FIG. 1 illustrates a block diagram of an example computer system in accordance with this invention.

FIG. 1 illustrates a block diagram of an example computer system 100 in accordance with this invention. The computer system 100 includes a command processor 110, a prefetcher 120, and a task processor 130. A data miner 140 may be included in the computer system 100, or in a separate system, such as a server in a client-server network, as will be discussed further below.

The data miner 140 processes a database that contains a history of usage of the system, hereinafter termed a usage log 150, for each user of the system. Based on the usage log 150 of each user, the data miner 140 creates a set of anticipated commands 160 for each user. In a preferred embodiment, the set of anticipated commands 160 is a dynamic set that is created when the user logs into the system 100, and is subject to modification as the user interacts with the system 100.

The entries in the usage log. 150 includes a subset of the commands, or requests, that each user has submitted in the past. In a preferred embodiment, each entry in the usage log 150 includes an identification of the user, the command, and the parameter, or arguments, associated with the command. The entry in a preferred embodiment also includes the date, time, and location of the user when the request was made. The subset of commands that are included in the usage log 150 may be created by an inclusion process, an exclusion process, or a combination of both. In an inclusion process, a list of "commands of interest" is provided, and each time that a user invokes one of the commands of interest, an entry is made in the usage log 150. In an exclusion process, a list of "commands of no-interest" is provided, and all commands that are not in this no-interest list are entered in the usage log 150. The commands of interest are those, for example, that relate to the primary applications, or work-related tasks, that are provided by the system. In the aforementioned medical application, the commands of interest, for example, would be those related to accessing and viewing patient records and test results. The commands of non-interest would be those that are not expressly submitted by the user, such as automatic log-in procedures and the like, and those that are not necessarily work related, such as games, on-line news browsers, and so on. Alternatively, all user requests may be entered into the usage log 150, and the commands of interest and no-interest can be filtered by the data miner 140. The choice of interest and no-interest commands will depend upon the particular environment in which the system 100 is used. Note that the term "commands" of interest is used herein in the general sense, and is intended to include "files" of interests, "records" of interest, and so on.

A number of techniques are provided in the data miner 140 to assess the usage log 150. For an individual user, the usage log may include time-independent patterns, location-independent patterns, time-dependent patterns, location-dependent patterns, location-and-time-dependent patterns, and so on. In like manner, the usage log may include correlated commands, sequential commands, unrelated commands, and so on. For example, a particular user may always view x-ray images and patient records at the user's office, while another may view these items at a variety of locations. A particular user may always view a patient's record before reviewing the patient's x-ray. Another user may view each current patient's record at the end of the day, and may only view the x-rays that hadn't been viewed during the day, and so on. In a preferred embodiment, a variety of formal and informal statistical techniques are employed to analyze the usage log 150 of a user; from this analysis, the user's future behavior is predicted. The formal statistical techniques include conventional likelihood estimation, Bayesian likelihood estimation, correlation analysis, time-series analysis, and other predictive techniques that are common in the art. The informal statistical techniques include expert systems, machine learning, knowledge based systems, and the like. For example, if a particular user always views a patient's record when viewing the patient's x-ray, the time of viewing an x-ray and a time of viewing a record will have a high coefficient of correlation, affirming that a relationship exists between the occurrence of these events. The correlation analysis can also be used to determine the specific parameters of the relationship between these times, for example, which event typically takes place first, the typical duration between events, and so on. In like manner, the statistical characteristics of the time differential between viewings of related x-rays can be used to predict when the next x-ray will be called for. A learning system may be used to predict which customer's records are going to be accessed next. In a preferred embodiment, ancillary information may also be provided, such as a categorization of each person's ailment. Using this ancillary information in conjunction with the usage log 150, for example, the data miner 140 may determine which files of a particular patient are likely to be accessed, based on prior access to these files, or prior access to corresponding files of patients with similar ailments.

Based on these informal and formal statistical techniques, the data miner 140 creates a set of anticipated commands 160 corresponding to the current user of the system 100. As a minimum, the set of anticipated commands 160 contains an identification of the command and any parameters required to effect the command. In a preferred embodiment, the set 160 includes a likelihood parameter for each command, indicating the estimated likelihood that this command is the next, or near next, request that the user is going to submit. As noted above, this set 160 can be dynamically modified, based on recent user requests. The estimated likelihood parameter for requesting a next-patient's x-ray, for example, will typically increase as the time interval from the request for a current-patient's x-rays increases the analysis of the usage:log 150 can be used to determine the rate of increase in the likelihood parameter for this view-the-next-patient's-x-ray command.

Also included in a preferred embodiment of the set of anticipated commands 160 is an estimate of a "cost" associated with each anticipated command. This cost can include a number of parameters that are typically associated with system performance. A primary cost factor is the time required to provide a response to the user's request. Some requests may incur a minimal time delay, while others, such as a download of an x-ray image from a remote server, may incur a substantial time delay. Other cost factors may be used in lieu of, or in combination with, this delay-time cost. For example, if the command is related to a download of a video sequence, the cost may include an estimate of the bandwidth required to communicate the sequence without noticeable gaps in the presentation of the sequences once the sequence begins. These parameters are also dynamically determined in a preferred embodiment. For example, the estimated delay time to download an x-ray image from a server may vary depending upon the other tasks or communications that impact the server or the communications channel. For ease of reference and understanding, the delay-time cost will be used hereinafter as a paradigm for the cost factor that is determined to be of concern in the example embodiment of this invention; the application of the principles of this invention to other cost factors will be evident to one of ordinary skill in the art in view of this disclosure.

In accordance with one aspect of this invention, the prefetcher 120 selects one or more anticipated commands 161 from the set of anticipated commands 160 and submits tasks 162 to the task processor 130 for execution. This selection and submission is performed before the user submits a request 101 corresponding to this command 161. In response to this command, the task processor 130 effects the appropriate action, and provides a response 165 to the prefetcher 120. For example if the command 161 is to view a patient's x-ray, and the x-ray is located at a distant server (e.g. a data file 225 at a server 220A in FIG. 2), the prefetcher 120 submits a download task 162 to the task processor 130 for that x-ray. The task processor 130 communicates with the server (not shown), receives the requested x-ray, and communicates the x-ray to the prefetcher 120 as a task response 165. The prefetcher 120 stores the task response 165 in a cache memory 180, in anticipation of the request 101 from the user for a display of the x-ray.

When the user submits a request 101 corresponding to the command 161, the command processor 110 communicates commands 111 to fulfill the request 101. In some cases, the communicated command 111, the anticipated command 161, and the user request 101 are identical to each other. In other cases, the command processor transforms a request 101 into a more structured form 111 that facilitates processing by the prefetcher 120 and task processor 130. In like manner, the form of the command 161 may be optimized for the data miner 140, and may not be a literal copy of the request 101, nor the command 111. Request and command processing and parsing techniques are common in the art. The prefetcher 120 recognizes that the user command 111 corresponds to the anticipated command 161, and reacts accordingly by transforming the command 111 into an alternative command or set of commands 112 that take into account the fact that a response 165 has already been received at the prefetcher 120, corresponding to the command 161. Continuing the example of a downloaded patient x-ray from a server, the prefetcher 120 transforms the user command 111 that calls for a display of the x-ray from the server into a command 112 that calls for a display of the x-ray from the cache storage 180 of the prefetcher 120. The response 125 from the prefetcher, then, is a combination of the response 115 to the command 112, and the response 165 to the command 161. The command processor 110 transforms the response 125 from the prefetcher 120 into a form suitable for presentation to the user as a response 105. As discussed further below, the command processor may also modify the interface presented to the user for receiving requests 101 or presenting responses 105, based on the anticipated commands 160.

Because the command 161 was initiated by the prefetcher 120 before the user submitted the request 101, the response time to the user request 101 can be expected to be shorter than the response time had command 161 not been initiated. In the example download of the x-ray from the server, if the "cost" associated with the anticipated command 161 is the delay time anticipated for the download of the x-ray from the server, then the prefetching of a response to the command 161 can be expected to be a cost-savings of this delay time.

As noted above, the set of anticipated commands 160 will typically include multiple anticipated commands, from which one or more are selected by the prefetcher 120. The selection process can take a variety of forms, depending upon the resources available to the prefetcher 120, the information that is associated with the anticipated commands, and so on. If a virtually infinite amount of cache storage 180 is available to the prefetcher 120, then each anticipated command can be processed in the order of their likelihood factor. If resources are limited, and cost information is available for each anticipated command, a cost and likelihood weighting can be applied, to select the anticipated command that is likely to produce the best cost savings. Techniques for optimizing expected cost-savings based on the likelihood of such savings are common in the art. Note that the cost factor associated with each anticipated command may be implicit, explicit, or a combination of both. In the simplest implementation, the cost of each command may be considered equal. Alternatively, if the anticipated command references a file, the size of the file can be used as the implicit cost of the command. This size need not be expressly contained in the set of anticipated commands 160, because system utilities are commonly available to obtain the size, on-demand. Other means for associating a cost to a command will be evident to one of ordinary skill in the art. For example, different cost factors can be associated with different classes of commands, higher costs being associated with graphic commands, lower costs to query commands, and so on.

Conventional caching techniques are employed in the prefetcher 120 to optimize the cache 180 potential by, for example, clearing stale information from the cache 180. In a preferred embodiment, these techniques are enhanced by the particular nature of the prefetcher 120. For example, based on the user's usage pattern, the likelihood of the user accessing the same information can be determined by the contents of the set of anticipated commands 160 after it is updated in response to the user command I II that accessed the information the first time. In a conventional cache management system, recently accessed information is retained, on the assumption that it will be re-accessed. If, based on the user's usage pattern, it is determined that the same x-ray, for example, is rarely re-accessed, the recently accessed x-ray is marked for deletion from the cache 180, thereby freeing cache 180 resources, as required; for subsequently anticipated commands 160.

As thus far presented, the prefetching of anticipated commands provides for a reduction in the actual response time to a user request 101, as measured by the time duration between the submission of the request 101 and the receipt of a response 105 to this request 101. In accordance with another aspect of this invention, the perceived response time is also reduced via the use of the set of anticipated commands 160. If a user request 101 is expected to incur a noticeable delay, the prefetcher 120 provides one or more alternative, responses 125 to the user during this delay period. The alternative response 125 is based on a response 165 to an alternative anticipated command 161. This response 125 may have been prefetched, as discussed above, or it may be a response 165 to the submission of anticipated command 161 that was selected based on the submission of the user request 101. For example, if the viewing of a patient's x-ray and the patient's record are strongly correlated; and the user submits a request 101 for the patient's x-ray, the alternative response 125 may be a presentation 105 of the user's record. In a preferred embodiment, the command processor 110 prefaces the presentation 105 of the user's record with a message to the user, such as: "The requested x-ray is being downloaded; in the meantime, here is the patient's medical record, for your review". Also in a preferred embodiment, the user is provided the option of objecting to this choice of alternative response 125, so that a different alternative selection 161 is provided in response to a subsequent request 101 for an x-ray. The alternative response 125 may be also be unrelated to the user request 101, or related to a prior request 101. For example, if a user frequently or randomly views abstracts of medical articles, the alternative response.125 may be a presentation 105 of an abstract whenever a request 101 is expected to exhibit, or actually exhibits, a noticeable delay. Other techniques are available for selecting an alternative response 125; for example, anticipated commands 160 that have a very low expected delay-time are given priority for selection over anticipated commands 160 that are expected to incur a noticeable delay.

Note that the presentation 105 of an alternative response 125 has a compound effect on the perceived delay time. Because the response 125 is likely to be something that the user would have subsequently requested, the presentation 105 of the response 125 provides the user the opportunity to use the delay time productively. Also, because the user is provided the alternative response 125, the user's attention is diverted, thereby reducing the frustration that is typically associated with delayed responses to requests.

In a preferred embodiment, the usage log 150 include the commands 112, 162 that are based on the operation of the prefetcher 120, as presented above, as well as the aforementioned user reactions to alternative responses 125, exhibited delay times, and the like. In such an embodiment, the data miner 140 includes learning algorithms, such as neural nets and causal nets, that modify the determination of the above referenced likelihood factors, based on the observed performance of the system, the user's response, if any, to the operation of the prefetcher 120, and any changes to the user's usage patterns in reaction to the changes in performance or operation introduced by the above features of this invention.

Figure 2:
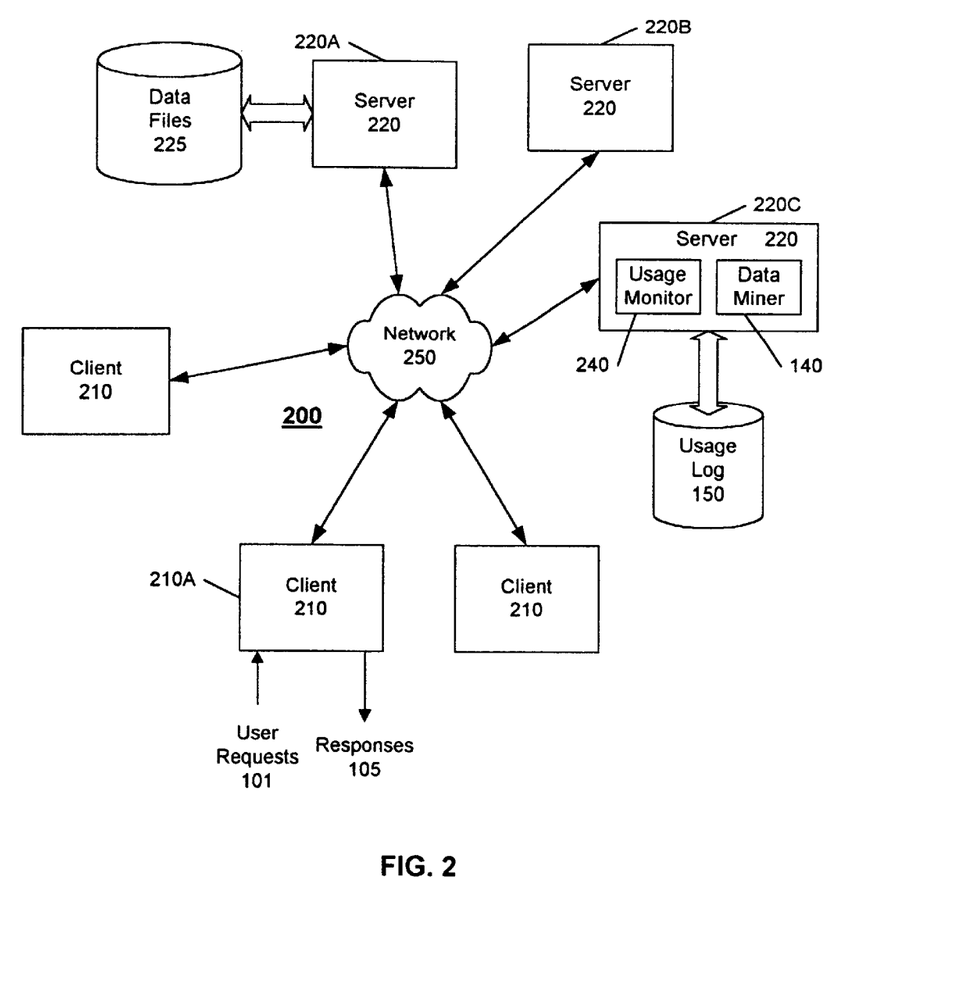
FIG. 2 illustrates a block diagram of a client-server computer system in accordance with this invention.

FIG. 2 illustrates a block diagram of an example client server implementation of this invention. In this example, the system 200 comprises client processors 210 and server processors 220 that are interconnected via a network 250. Each user accesses the resources of the network 250 via a client processor 210; the client processors 210 may be dedicated to each user, or shared among multiple users. Consistent with typical two-tier client-server architectures, the command processor 10, the prefetcher 120, and the task processor 130 of FIG. 1 are located in each client processor 210, and the data miner 140 is located in a server 220C. Other architectures may have an alternative distribution of functions among client and server processors. In a closed organization structure, for example, the client processors 210 may only contain the command processor 110, all of the remaining functions being located at a server 220. Also located in the server 220C is a usage monitor 240 that adds entries to the usage log 150, using the inclusion or exclusion techniques discussed above. Depending upon the allocation of tasks between the data miner 140 and the prefetcher 120 of FIG. 1, the set of anticipated commands 160 (not illustrated in FIG. 2) may be located at either a server 220 or the client 210A at which the user requests are submitted. In a preferred embodiment, the data miner 140 creates the set of anticipated commands 160 and related information based on the information contained in the usage log 150, downloads the set 160 to the client 210A, and continually updates the set 160 based on additional information provided by the usage monitor 240 and other sources, such as system performance monitors and the like (not shown).

In addition to the prefetching operation and alternative response operation discussed above, the usage log 150 is also used to optimize the overall performance of the system 200 illustrated in FIG. 2. A common technique for assuring that a system satisfies future requirements is to observe the performance of the system, or a simulated performance of the system, with a simulated increase in utilization, to identify bottlenecks or other performance-limiting problems. Proposed changes to address the performance-limiting problems are added to, the simulated model of the system, or added to the actual system on a trial basis, and the simulations are repeated to verify the effects of the intended changes, or to identify a need for other changes. When a suitable set of changes are identified, they are implemented on the actual system 200, thereby keeping the system 200 "one step ahead" of future requirements. In a preferred embodiment of this invention, the usage log 150 is used to provide at least a portion of the simulated increase in utilization that is used to simulate the system model and proposed changes. Using the techniques discussed above regarding the production of anticipated commands 160, the data miner 140 provides sets of simulation commands, including commands 160 that a user is likely to submit, based on actual usage patterns as derived from the usage log 150. Except in rare situations, simulations based on actual user usage can be expected to provide a more accurate representation of future demands on the system 200, and therefore provide a more accurate assessment of the effects of proposed changes to improve the future performance of the system 200.

Figure 3:
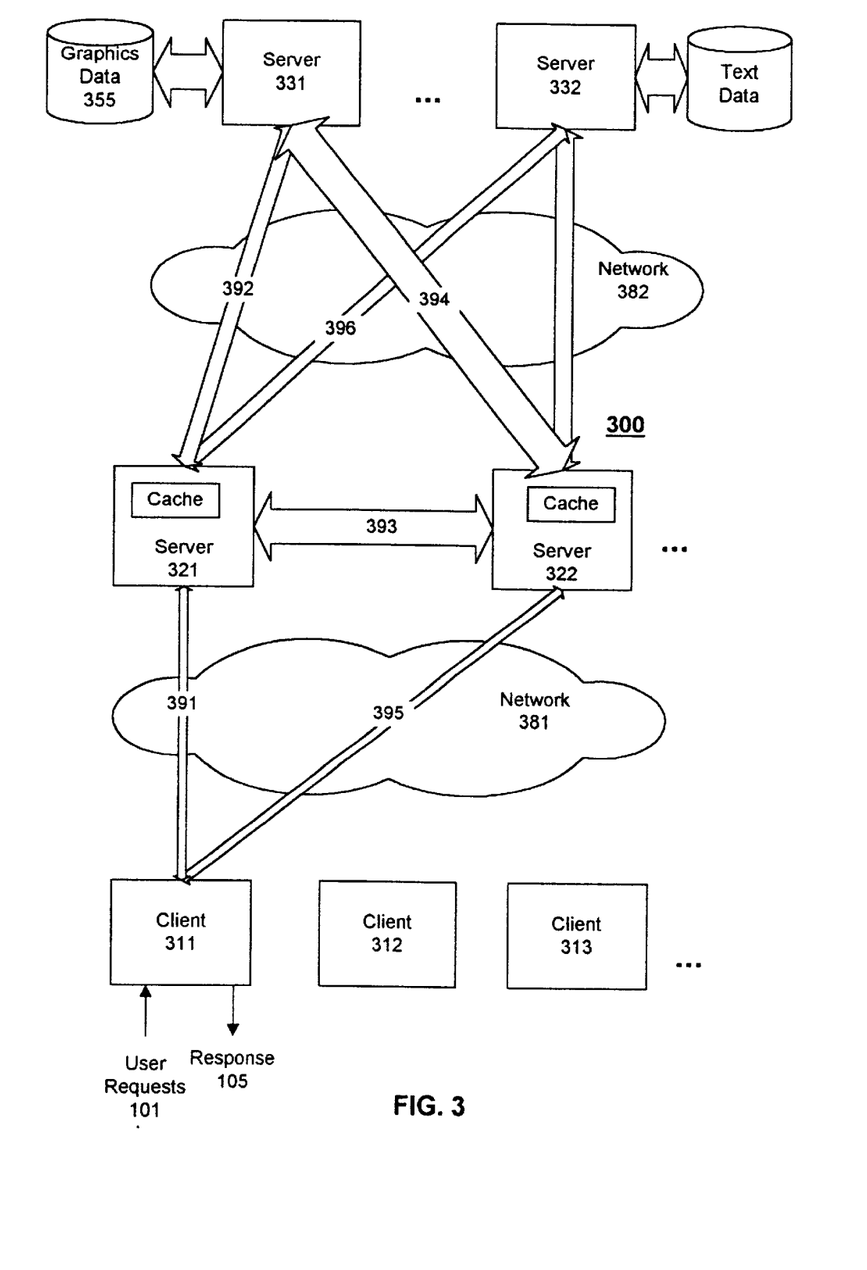
FIG. 3 illustrates a block diagram of a three-tier client-server computer system in accordance with this invention.

In addition to providing a means for more accurately assuring future system performance, the usage patterns from the usage log 150 are also used in a preferred embodiment to improve current system performance. Illustrated in FIG. 3 is a 3-tier client-server system 300. In accordance with this invention, the use of the usage log for optimizing actual or perceived response time, or other optimizations, is not limited to the client processor that the user accesses. To minimize response time between the clients 311, 312 and the upper-tier servers 331, 332, for example, each of the middle-tier servers 321, 322, in the system 300 contain a prefetcher that caches information from the upper-tier servers 331, 332 in anticipation of requests from users at the clients 311, 312.

In addition to caching data from other servers, the middle-tier servers 321, 322 also effect other actions in anticipation of user commands to optimize system performance. In a preferred embodiment of the system 300, the middle-tier servers 321, 322 effect load-balancing based on the effective bandwidth among the servers and clients to minimize transport delays, or based on the effective processing power at each server to minimize processing delays, and so on. For example, illustrated in FIG. 3 are communications paths 391–396, representing the resultant paths through the networks 381, 382, typically through switches, routers, and other communications devices common in the art. For ease of understanding, the resultant bandwidth of each path 391–396 in this example system 300 is illustrated by the width of the arrow representing each path. That is, the bandwidth of the path 393 between servers 321 and 322 is illustrated as being greater than the bandwidth of paths 391, 392, 395, and 396, and similar to the bandwidth of path 394.

In conventional load-balancing algorithm based on bandwidth, the typical rule is to choose an alternative path whenever the traffic on a path exceeds a given percentage of the available bandwidth on that path. In accordance with this invention, alternative paths are selected based on an anticipated traffic load that is determined from the user's usage patterns. Consider, for example, a particular user who is known to typically access image data 355 at server 331. In accordance with this aspect of the invention, if this user logs onto a client 311, for example, that is bound to server 321, the server 321 redirects the binding of the client 311 to server 322, via path 395, because server 322 has a larger bandwidth communications path 394 to the data 355 at server 331. As compared to the conventional load-balancing, this redirected binding will be effected in anticipation of a bandwidth demand, rather than waiting for a potential saturation of the available bandwidth.

Other means of load balancing in anticipation of user commands will be evident to one of ordinary skill in the art in view of this invention. For example, the server 321 can prefetch the image data 355 at server 331 via path 392 if a sufficient lead time is anticipated, or via server 322 and higher bandwidth paths 394–393 if the user is expected to request the data sooner. In like manner, the servers 321, 322 can base their load and traffic allocation on the combination of usage patterns from all of the current users of the system. For example, if a few users that typically access image data 355 are already bound to server 322, the server 321 may choose not to route traffic via the server 322, independent of the current traffic on the path 394.

Another aspect of this invention is the optimization of the user interface based on usage patterns. Conventionally, user interfaces are designed to be convenient for a hypothesized "average user". With a variety of different users using networked systems the "average" interface is often inefficient for all but a few "average" users. The aforementioned medical system networks, for example, is used by doctors, technicians, administrators, nurses, and so on, each having fundamentally different requirements. An administrator, for example, may access a spreadsheet program and a scheduling program while dealing with a patient's record, whereas a doctor might rarely access the spreadsheet program while dealing with a patient's record. In a preferred embodiment of this invention, the interface presented to the user is dependent upon the user's usage patterns. For example, different "shortcut" icons are presented to different users while viewing a patient's record. The aforementioned administrator will be presented a shortcut icon to the spreadsheet, while the doctor will be presented a shortcut to, for example, the patient's x-ray file. In like manner, the layout presentation of icons may also be determined based on each user's usage patterns. For example, the icons for frequently used applications or requests, or strongly correlated requests, may be clustered together.

Note that the determination of predictions and parameters based on the usage patterns may be performed differently for each of the different uses presented herein. For example, the determination of an anticipated next command by a user may be highly dynamic, whereas the clustering of icons may be fairly static and based on a longer history of usage, to minimize any confusion that may be caused by a rearrangement of icons.

In accordance with another aspect of this invention, the determination of anticipated commands is also used to enhance security. If it is determined that the selected anticipated commands 161 have little correlation to a series of user requests 101, then it is reasonable to assume that either the user's usage pattern has changed, or that a different person is accessing the system with this user's identity. In a preferred embodiment of this invention, the prefetcher 120 includes a security monitor (not shown) that provides a security assessment that is based on the correlation, or lack of correlation, between the user requests 101 and anticipated commands 161. In a preferred embodiment, this correlation determination also addresses time and location parameters associated with the requests, as well as the request content. For example, if a user's usage pattern shows no accesses to the system during weekends, and a request 101 from this user is subsequently received on a Saturday evening, this may be an indication of a potential security problem. Similarly, if requests 101 are received from the same user from two locations that are distant from each other within a time span that would normally be considered insufficient for the user to traverse this distance, this may be an indication of a potential security problem. Other techniques for assessing abnormal behavior patterns based on prior behavior are common in the art. If the security assessment indicates a security risk, the command prefetcher communicates a security alert response to a system administrator, for a potential follow-up, and may request an additional identity verification from the user before providing particularly sensitive materials.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the disclosure above, the anticipated commands 161 are used in a "passive" manner to reduce the actual or perceived response times. A more assertive use of the anticipated commands is to notify the user when a request 101 corresponding to an anticipated command 161 has not yet been submitted. For example, if a user typically makes an entry into a time-management system after reviewing each patient's records, the command processor 110 prompts the user whenever a new patient's record is accessed and the time-management program has not been accessed since viewing the current patient's record.

The configurations and structures provided in the drawings are for illustration purposes, and can be implemented in hardware, software, firmware, or a combination of each. The allocation of functions between the command processor 110, the prefetcher 120, and the data miner 140, for example, is presented for ease of understanding. The data mining function could equally well be placed in the prefetcher 120; the partitioning of a user request 101 into commands addressed to the cache 180 and others can be effected within the command processor 110; and so on. These and other configuration and optimization techniques will be evident to one of ordinary skill in the art in view of this invention, and are within the intended scope of the following claims.

We claim:

1. A computer system comprising:
   a database containing a usage log of the computer system by at least one user, wherein said usage log includes a list of previously issued commands and correlated by said command's usage pattern;
   a data miner configured to offer a sequential list of anticipated commands, also referred to as anticipated requests, personalized for said at least one user, wherein said data miner utilizes said at least one user's said usage log data to create the sequential list of anticipated commands and assigning a cost value to each of the commands of the sequential list of anticipated commands;
   a command processor for processing user requests and for determining projected required time for completion of a user request from the cost value, wherein if said projected required time is greater than a predefined time value said processor executes other fast-response commands selected from the sequential list of anticipated commands in parallel with the user request;
   a cache management system for marking contents accessed by processing said user requests for deletion based on a usage pattern associated with said at least one user.

2. The computer system of claim 1, further including:
   a prefetcher for initiating a processing task based on at least one command from said personalized list of anticipated commands in anticipation of said at least one user's initial needs, wherein said processing task includes retrieving at least one document or initiating at least one command anticipated, by the data miner, as being requested by said at least one user but which may not have been previously requested.

3. A computer system as in claim 1, wherein said list of anticipated commands includes at least one command from a group comprising of: application launch, site navigation, database query, document retrieval, and administration.

4. The computer system of claim 1, wherein the data miner utilizes one or more usage patterns of said usage log, selected from the group consisting of: time-independent patterns, location-independent patterns, time-dependent patterns, location-dependent patterns, and time-and-location-dependent patterns, for the purpose of offering said sequential list of anticipated commands.

5. The computer system of claim 1, further including a security monitor that provides a security assessment that is based on the current request of the user and the at least one anticipated request of the user, and wherein the command processor also provides the response in dependence upon the security assessment.

6. The computer system of claim 1, further including a user interface configured based upon the at least one anticipated request of the user and facilitates reception of the current request of the user, said user interface being dependent upon said usage pattern associated with said at least one user, such that said user interface for a first user is different than that of a second user where the first user and the second user have different usage patterns.

7. The computer system of claim 2, wherein the prefetcher includes a cache storage that stores the prefetched result corresponding to the at least one anticipated request.

8. The computer system of claim 7, wherein the prefetcher includes the cache management system that deallocates portions of the cache storage based upon the usage pattern associated with the user.

9. A computer system comprising:
- a database containing a usage log of the computer system by at least one user, wherein said usage log includes a list of previously issued commands and correlated by said command's usage pattern;
- a data miner configured to offer a sequential list of anticipated commands, also referred to as anticipated requests, personalized for said at least one user, wherein said data miner utilizes said at least one user's said usage log data to create the sequential list of anticipated commands;
- a user interface that facilitates a reception of a current request of a user based upon at least one anticipated request of the user, said user interface being dependent upon a usage pattern associated with said at least one user, such that said user interface for a first user is different than that of a second user where the first user and the second user have different usage patterns;
- a command processor for processing user requests and for determining projected required time for completion of a user request, wherein if said projected required time is greater than a predefined time value said processor executes other fast-completion commands selected from the sequential list of anticipated commands in parallel with the user request; and
- a cache management system for marking contents accessed by processing said user requests for deletion based on said usage pattern associated with said at least one user.

10. The computer system of claim 9, further including a security monitor that provides a security assessment that is based on the current request of the user and the at least one anticipated request of the user, wherein the command processor also provides the response in dependence upon the security assessment.

11. A computer system comprising:
- a database containing a usage log of the computer system by at least one user, wherein said usage log includes a list of previously issued commands and correlated by said command's usage pattern;
- a data miner configured to offer a sequential list of anticipated commands, also referred to as anticipated requests, personalized for said at least one user, wherein said data miner utilizes said at least one user's said usage log data to create the sequential list of anticipated commands;
- a command processor for processing user requests and for determining projected required time for completion of a user request, wherein if said projected required time is greater than a predefined time value said processor executes other fast-completion commands selected from the sequential list of anticipated commands in parallel with the user request;
- a plurality of server processors, each server of the plurality of server processors having a server capacity;
- a server allocator that provides a communications path between the at least one user and a selected server of the plurality of server processors in dependence upon the at least one anticipated request of the user and the server capacity of the selected server, wherein said communications path is selected based on an anticipated traffic load determined from a usage pattern associated with said at least one user; and
- a cache management system for marking contents accessed by processing said user requests for deletion based on said usage pattern associated with said at least one user.

12. The computer system of claim 11, wherein the communications path has a bandwidth, and the server allocator provides the communications path between the user and the selected server in further dependence upon the bandwidth.

13. The computer system of claim 11, wherein communications among the plurality of server processors are via network paths that each have an associated bandwidth, and the selected server includes a prefetcher that initiates a processing task based on at least one anticipated request and also based the bandwidth of at least one of the network paths.

14. A method for determining system performance, comprising:
- creating a database containing a usage log of the computer system by at least one user, said usage log defining said at least one user's usage pattern of the computer system, includes a list of previously issued commands and correlated by said command's usage patterns;
- offering by a data miner a sequential list of anticipated commands personalized for said at least one user, wherein said data miner utilizes said at least one user's said usage log data to create the sequential list of anticipated commands;
- simulating a response of a system using the prior user requests of the database of usage patterns to provide thereby simulated performance parameters that correspond to measures of the system performance; and
- marking contents accessed by processing said user requests for deletion based on said at least one user's usage pattern.

15. The method of claim 14, further including modifying the system in dependence upon the simulated performance parameters.

16. The computer system of claim 1, wherein the cost value is calculated from any number of criteria selected from the group consisting of at least: retrieval time, priority, display time, file size and frequency of request.

* * * * *